United States Patent
Birmingham et al.

[11] Patent Number: 6,110,247
[45] Date of Patent: Aug. 29, 2000

[54] MICROMACHINED IMPACTOR PILLARS

[75] Inventors: Joseph G. Birmingham, Richland; Vanessa M. Kenning, Kennewick; Patrick T. Call, Richland; Charles J. Call, Pasco, all of Wash.

[73] Assignee: MesoSystems Technology, Inc., Richland, Wash.

[21] Appl. No.: 09/191,979

[22] Filed: Nov. 13, 1998

[51] Int. Cl.$^7$ ................................................ B01D 47/14
[52] U.S. Cl. .............................. 55/442; 55/443; 55/444; 55/524; 55/DIG. 39
[58] Field of Search ........................... 55/442, 443, 444, 55/524, DIG. 39

[56] References Cited

U.S. PATENT DOCUMENTS

| | | |
|---|---|---|
| 877,460 | 1/1908 | Brunner et al. . |
| 902,958 | 11/1908 | Galusha . |
| 906,038 | 12/1908 | Terry . |
| 1,603,878 | 10/1926 | Smith . |
| 1,807,378 | 5/1931 | Budil . |
| 1,825,274 | 9/1931 | Leach . |
| 2,939,545 | 6/1960 | Silverman ................................. 55/444 |
| 3,693,457 | 9/1972 | Pilat . |
| 3,754,868 | 8/1973 | Witz et al. . |
| 3,932,151 | 1/1976 | Lau . |
| 3,983,743 | 10/1976 | Olin et al. . |
| 4,133,202 | 1/1979 | Marple . |
| 4,321,822 | 3/1982 | Marple et al. . |
| 4,387,603 | 6/1983 | Nelson . |
| 4,452,068 | 6/1984 | Loo . |
| 4,640,140 | 2/1987 | Burghoffer et al. . |
| 4,689,052 | 8/1987 | Ogren et al. . |
| 4,697,462 | 10/1987 | Daube, Jr. et al. . |
| 4,732,585 | 3/1988 | Lerner ...................................... 55/444 |
| 4,764,186 | 8/1988 | Langer . |
| 4,857,276 | 8/1989 | Seto et al. ................................. 55/444 |
| 4,877,430 | 10/1989 | Gutermuth . |
| 4,891,052 | 1/1990 | Belin et al. ............................... 55/444 |
| 4,941,899 | 7/1990 | Liu . |
| 4,942,297 | 7/1990 | Johnson et al. . |
| 4,990,740 | 2/1991 | Meyer . |
| 5,040,424 | 8/1991 | Marple et al. . |
| 5,128,539 | 7/1992 | Rodgers et al. . |
| 5,254,861 | 10/1993 | Carpenter et al. . |
| 5,302,174 | 4/1994 | Guetersloh ............................... 55/444 |
| 5,318,609 | 6/1994 | Kittler . |
| 5,332,550 | 7/1994 | Booker . |
| 5,412,975 | 5/1995 | Raabe et al. . |
| 5,472,645 | 12/1995 | Rock et al. . |
| 5,498,271 | 3/1996 | Marple et al. . |
| 5,512,216 | 4/1996 | Rock et al. . |
| 5,676,718 | 10/1997 | Davison et al. ......................... 55/524 |

FOREIGN PATENT DOCUMENTS

| | | |
|---|---|---|
| 0 543 108 A1 | 5/1993 | European Pat. Off. . |
| 626191 | 8/1927 | France . |
| 13 10 913 U | 9/1934 | Germany . |
| 2 260 729 | 5/1974 | Germany . |

OTHER PUBLICATIONS de la Mora, J.F., "Aerodynamic Focusing of Particles and Heavy Molecules, First Annual Report," NTIS, Feb. 16, 1988, 16 pages.

de la Mora, J.F., "Aerodynamic Focusing of Particles and Heavy Molecules. Final Report," NTIS, Jan. 8, 1990, 12 pages.

de la Mora, J.F., "Drastic Improvement of the Resolution of Aerosol Size Spectrometers via Aerodynamic Focusing: The Case of Variable–Pressure Impactors," *Chemical Engineering Communications*, vol. 151, 1996, pp. 101–124.

(List continued on next page.)

*Primary Examiner*—David A. Simmons
*Assistant Examiner*—Minh-Chau T. Pham
*Attorney, Agent, or Firm*—Ronald M. Anderson

[57] ABSTRACT

A plurality of micropillars (2) arranged in a plurality of rows (4, 6, 8) are provided. When a particle-laden fluid stream is caused to flow through the micropillars, at least a portion of the particles impacts and becomes deposited on the micropillars' surfaces while the fluid stream is deflected aside. The deposited particles may subsequently be collected.

27 Claims, 3 Drawing Sheets

OTHER PUBLICATIONS de la Mora, J.F., et al., "Aerodynamic Focusing of Particles in a Carrier Gas," *Journal of Fluid Mechanics,* vol. 195, Oct. 1988, pp. 1–21.

Fernandez–Feria, R., et al., "Brownian–Motion Limited Aerodynamic Focusing of Heavy Molecules," Rarefied Gas Dynamics, Beylich, A.E., Ed., Proceedings of the 17th International Symposium on Rarefied Gas Dynamics, Jul. 8–14, 1990, pp. 214–221.

Fuerstenau, S., et al., "Visualization of Aerodynamically Focused Subsonic Aerosol Jets," *Journal of Aerosol Science,* vol. 25, No. 1, Jan. 1994, pp. 165–173.

Jurcik, B., et al., "On the Shape of Impactor Efficiency Curves," *Journal of Aerosol Science,* vol. 26, No. 7, 1995, pp. 1139–1147.

Liu, P., et al., "Optimizing the Detection Efficiency of a Low Pressure, In–Situ Particle Monitor Using Aerodynamic Focusing Lenses," Proceedings—Institute of Environmental Sciences, 1996, pp. 217–224.

Patent Cooperation Treaty Search Report, PCT–US98–12471, Corona Catalysis Corporation et al., Oct. 14, 1998.

Vance, Richard F., "Slanted Baffle Mist Eliminator", *U.S. Statutory Invention,* Registration No. H1499, Nov. 7, 1995.

Willeke, K. et al., "Improved Aerosol Collection by Combined Impaction and Centrifugal Motion," *Aerosol Science and Technoloy,* 28:5 May 1998, pp. 439–456.

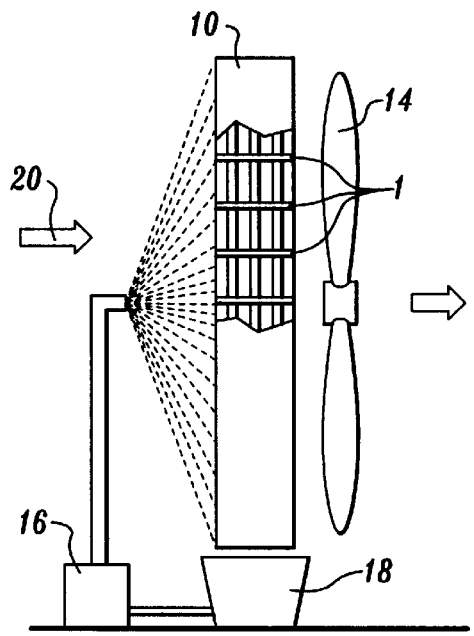
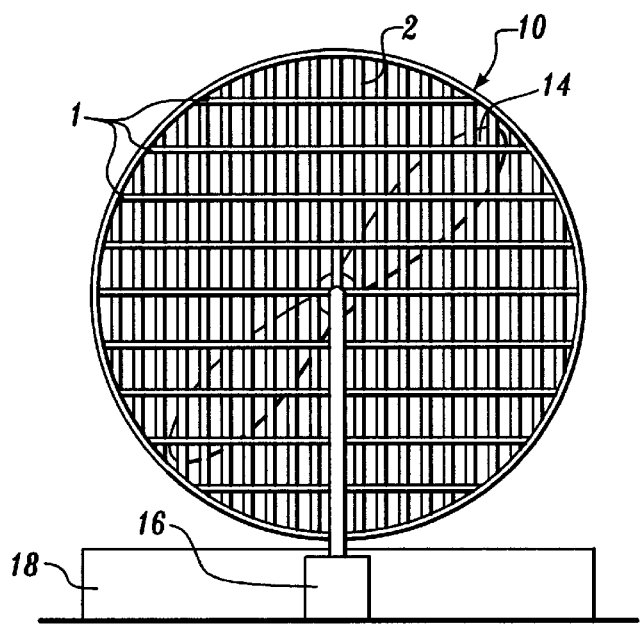
*Fig. 4A*  *Fig. 4B*
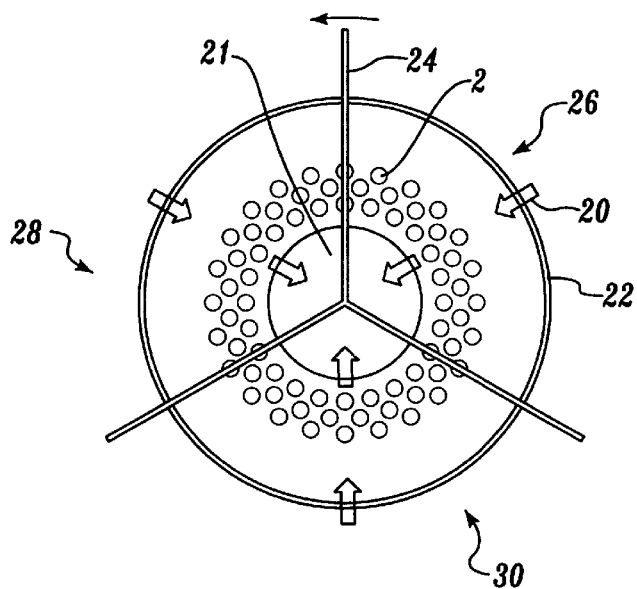
*Fig. 5*

MICROMACHINED IMPACTOR PILLARS

This invention was made with government support under Contract DAAM01-97-C-0036 awarded by the U.S. Department of Defense. The government has certain rights in this invention.

FIELD OF THE INVENTION

This invention pertains to the field of separating and collecting particles from a fluid stream and, more particularly, to a plurality of micromachined impactor pillars for collecting particles thereon.

BACKGROUND OF THE INVENTION

The separation and capture of particles or aerosols from air or other fluid streams are of concern in two contexts: first, in determining the type and concentration of such particles/aerosols and, second, in cleansing the fluid stream for subsequent use. For example, the detection or extraction of airborne biological or chemical warfare agents, biological contamination in confined spaces, such as aircraft or hospitals, or industrial pollutants (either in ambient air or in smokestacks) may be required in various scenarios.

Much effort has been expended in the past in the detection and extraction of particles or aerosols, generally in air or other gaseous streams. Impactors have been used for collecting aerosol particles for many decades. In their typical embodiments, a stream of gas containing particles is accelerated toward an impactor plate. Due to their inertia, the particles hit the impactor plate and are collected there while the gas is deflected to the side. Therefore, only larger particles with greater mass and inertia are collected on the impactor plate for separation and/or detection, while smaller particles with less mass and inertia are carried away by the gas stream.

However, a significant cause of inaccuracy in such impactors results from the deposition of particles on surfaces of the impactor plate other than the intended collection surfaces. Additionally, particles may bounce from the collection surfaces upon impact and reentrain in the gas stream.

Both a efficiency particulate airfilter (HEPA) and/or ELECTRET® fiber filter can be used as a fluid filter to capture particles/aerosols. These filters, however, typically create a large pressure drop within the filter, which may hinder efficient flow of a fluid stream and, thus, separation and collection of particles entrained in the fluid stream, as well as capacity. Aerogels have been used to overcome the pressure drop problem but they, like other materials comprising fibrous materials, tend not to allow easy extraction of the particles entrapped therein for subsequent collection or analysis.

A need exists for impactors that efficiently separate and collect particles thereon, and retain the collected particles without immediately releasing them back into a fluid stream. Preferably, such impactors do not cause a large pressure drop and, also, allow for easy extraction of the particles therefrom, subsequent to the particle deposition onto the impactors.

SUMMARY OF THE INVENTION

The present invention provides a plurality of orderly arranged micromachined "micropillars" for separating and collecting particles from a fluid stream. The micropillars are arranged in at least one row, and preferably in a plurality of rows that are spaced apart from each other. The micropillars in each row are spaced apart from each other to define fluid passageways therebetween. When more than one row is provided, the micropillars in a row are offset from the micropillars in an immediately adjacent row.

When a particle-laden fluid stream is caused to flow through the micropillars, at least a portion of the particles impact and become deposited on the surfaces of the micropillars due to their inertia, while the fluid stream is deflected aside and flows around the micropillars. To further facilitate separation of the particles, electric charge may be embedded in the micropillars to create an electric field, in a similar manner as in typical ELECTRET® materials or in semiconductor materials that include appropriate dopants as known in the art. Alternatively, electric charge may be applied externally on the surfaces of the micropillars by applying a conductive coating on the micropillar surfaces and charging the coating. Optionally, a suitable absorbent material may be included in the spaces between the micropillars to spread out the electric field created among the micropillars, to further facilitate particle separation.

The particles deposited on the micropillars may subsequently be collected. One method of collection involves vibrating the micropillars to extract the particles therefrom. Another method of collection is to rinse off the particles with suitable fluid, such as water. A suitable coating material may be applied on the surfaces of the micropillars to assist initial retention of the particles that impact the micropillars and, also, subsequent removal of the particles from the micropillars for collection or analysis.

The micropillars of the present invention present orderly arranged impact surfaces for efficiently collecting particles thereon without a large pressure drop. The micropillars thus allow for reduced power consumption while maintaining a high flow rate. When a coating is applied on their surfaces, the micropillars retain particles upon impact, and further allow for easy subsequent removal of the deposited particles therefrom. The micropillars may be used to collect particles of many different sizes, e.g., approximately 0.1- to 100-micron diameter sizes, and may be used independently, or in combination with any other particle separator/collector as a prefilter or a postfilter.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 4A is a schematic side view of a particle separation apparatus incorporating the micropillars of the present invention;

FIG. 4B is a schematic front view of the apparatus of FIG. 4A; and

FIG. 5 is a schematic top plan view of another particle separation apparatus incorporating the micropillars of the present invention.

DETAILED DESCRIPTION OF THE PREFERRED EMBODIMENT

In the present description, the prefix "micro" is generally applied to devices or components that have submillimeter size features. The prefix "micro" also denotes components that are designed to exploit processes which can be accelerated at reduced scales, for example, the process of heat transfer or the process of particle inertial separation from a fluid stream. Microdevices are fabricated using micromachining techniques known in the art, such as photolithography, deep ultraviolet (or x-ray) lithography, electrodeposition, micromilling, electrodischarge machining (EDM), laser ablation, and reactive or nonreactive ion etching.

Also, as used hereinafter, the following terms shall have the following definitions:

Particle—any separately identifiable solid, liquid, aerosol, or other component entrained in a fluid stream that has a greater mass than the fluid forming the fluid stream, and is the subject of separation and collection for analysis;

Fluid—any fluid susceptible to fluid flow, which may comprise liquids or gases, and which may entrain foreign particles therein. Unless otherwise noted, fluid shall mean the ambient fluid containing unconcentrated particles for collection, not the fluid into which the particles are concentrated after collection or capture.

Figure 1:
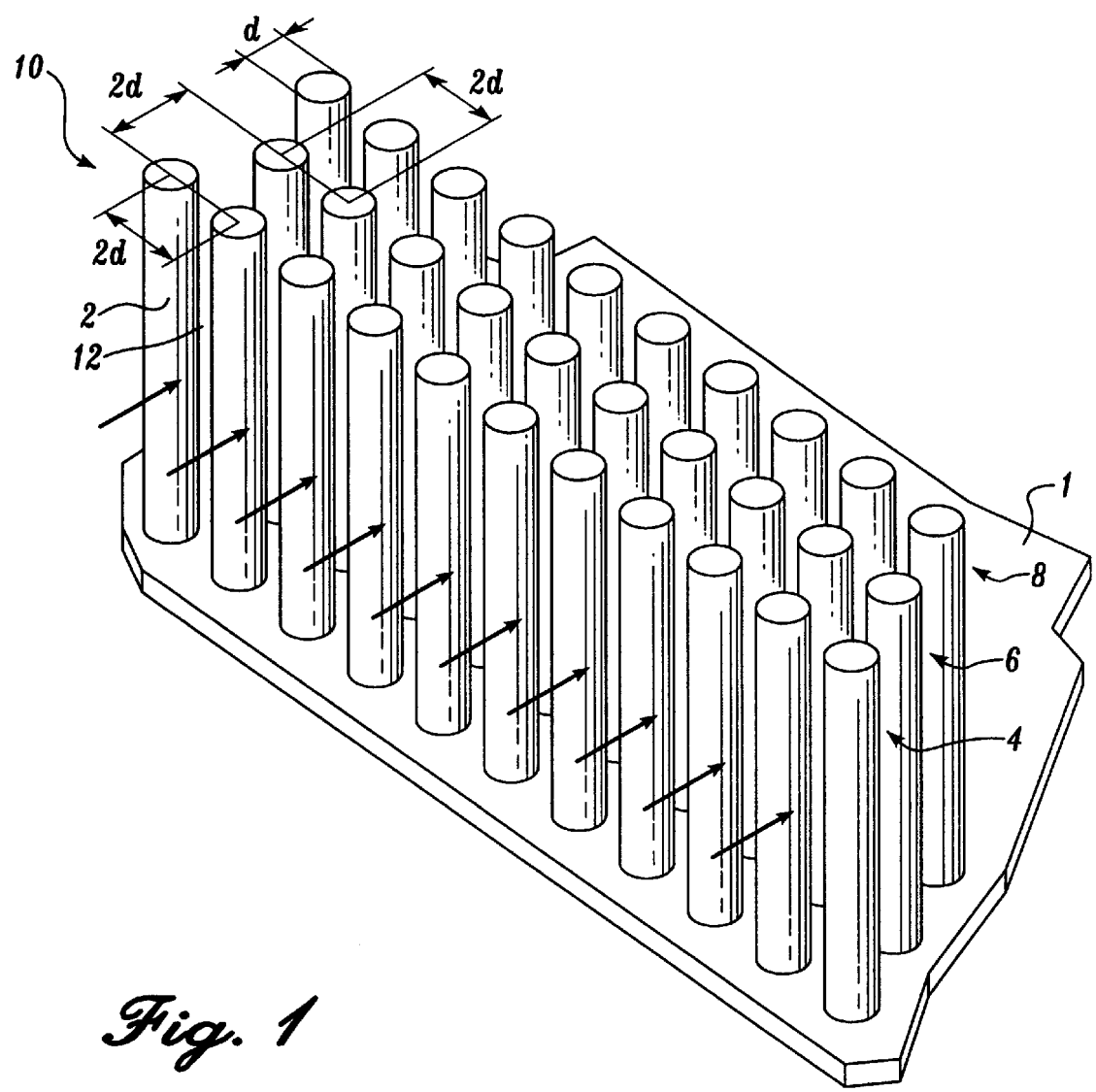
FIG. 1 illustrates a plurality of micromachined micropillars of the present invention for collecting particles thereon.
Figure 2:
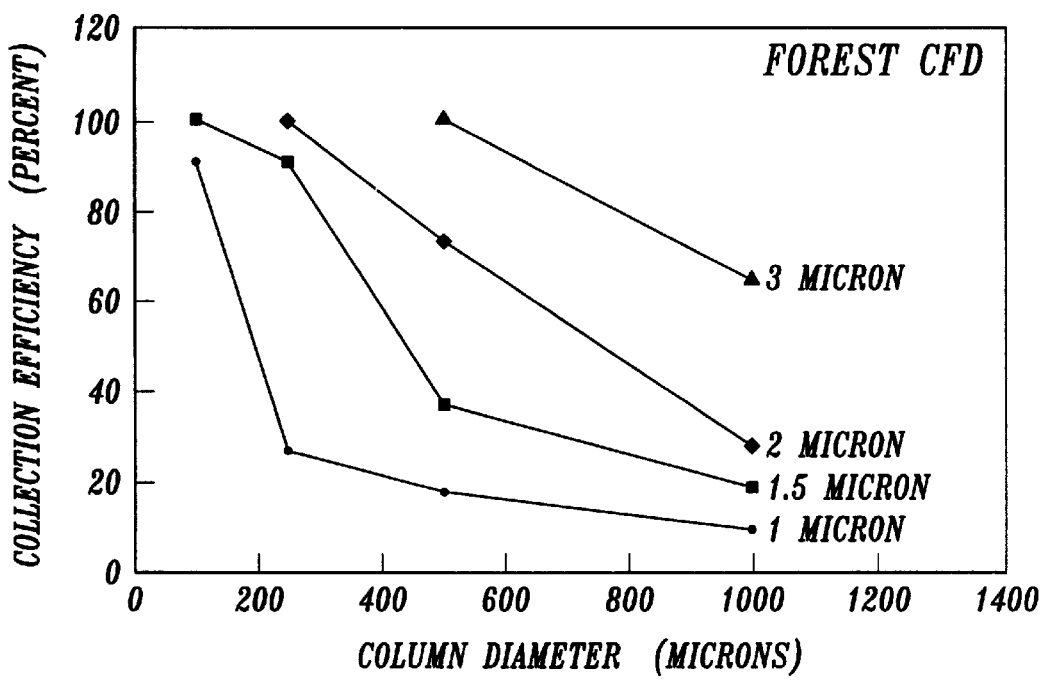
FIG. 2 is a graph showing collection efficiency of the micropillars of FIG. 1 having various diameter sizes.
Figure 3:
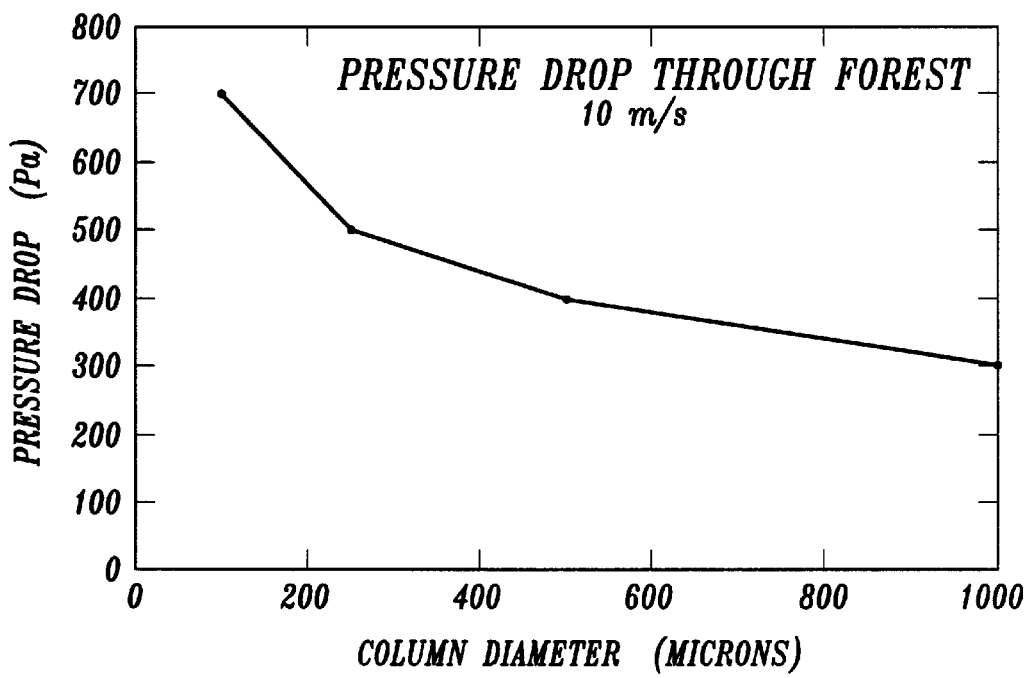
FIG. 3 is a graph showing the pressure drop across the micropillars of FIG. 1.

Referring to FIG. 1, a particle collection sheet 1 includes a plurality of micropillars 2 arranged in a plurality of rows, for example, in first, second, and third rows 4, 6, and 8. Micropillars 2 are collectively termed "micropillar array" 10. The illustrated micropillar 2 is a column having a round cross-section with a diameter "d". While the preferred embodiment comprises micropillars having a round cross-section, other cross-sections may be suitable. For example, triangular, rectangular, or teardrop-shaped cross-sections may be used. Collection sheet 1 including micropillars 2 may be made of any material suitable for micromachining, such as plastics and metals, and may be rigid or flexible. Micropillars 2 in each row are spaced apart from each other to form fluid passageways 12 therebetween. Micropillars 2 in second row 6 are offset from micropillars in first and third rows 4, 8. Rows 4, 6, and 8 are spaced apart from each other.

When a particle-laden fluid stream is caused to flow through micropillar array 10 in the direction of the arrows in FIG. 1, micropillars 2 collectively present a very tortuous path for particles to traverse through. While a fluid stream is accelerated through passageways 12 in one row toward micropillars 2 in an immediately downstream row, some particles entrained in the fluid stream fail to negotiate turns presented by micropillars 2 and may impact and become deposited on micropillars 2 due to the particles' inertia.

A diameter "d" of micropillar 2 may range from about 1 to about 4,000 microns. Preferably the diameter "d" ranges from about 100 microns to about 400 microns for capturing biological particles. The diameter "d" of micropillars, the spacing between micropillars in a row, and the spacing between adjacent rows of micropillars will affect the pressure drop, flow rate, and collection efficiency of the micropillars for collecting particles of various sizes. As more fully described below, it has been observed that under certain conditions spacing the micropillars in each row apart about "2 d" as measured between their central axes, and spacing adjacent rows apart about "2 d" provide acceptable results. The height of each pillar depends on the desired throughput level, and is freely modifiable, subject only to the machining constraints of a chosen micromachining method. Further, as more fully described below, one can stack a plurality of collection sheets 1 to increase the "total" height of the micropillars 2 indefinitely.

FIG. 2 illustrates collection efficiency of array 10 of micropillars 2 having 100-, 250-, 500-, and 1000-micron diameters, respectively, in collecting 1-, 1.5-, 2-, and 3-micron diameter particles, having a mass density of about 1 gm/cm$^3$. FIG. 2 was obtained from computational fluid dynamics (CFD) simulations. The simulations assumed the spacing between micropillars in a row as measured between their central axes to be twice the diameter of the micropillar, and the spacing between adjacent rows of micropillars to be also twice the diameter of the micropillar. The simulation further assumed the height to diameter ratio of each micropillar to be infinitely large, and the inlet velocity of a particle-laden fluid stream to be 10 meters/second (m/s). Under these conditions, 100-micron micropillars are most efficient in collecting particles of various sizes, with collection efficiency of more than about 90% for all particles. It should be noted that 250-micron micropillars performed nearly as well as the 100 micron micropillars, with collection efficiency of more than about 90% for particle sizes of 1.5 microns and larger. 500-micron micropillars performed well with collection efficiency of about 70% for particles of 2 microns and larger, and 1000-micron micropillars performed well with collection efficiency of about 60% for particles of 3 microns and larger. Collection efficiency as used herein refers to the percentage of the particles of the noted diameter that are removed. For particles larger than the given size, the percentage removed should be greater than the collection efficiency. FIG. 3 shows pressure drop measured across micropillar array 10 of micropillars 2 having various diameter sizes, also obtained from CFD simulations. The simulations were conducted under the same assumptions as the simulations of FIG. 2. It shows that pressure drop increases as the diameter "d" and spacing of micropillars 2 decrease.

It should be understood that those skilled in the art will be able to readily ascertain the preferred diameter and spacing of micropillars for a given situation or application based on a desired pressure drop, flow rate, and the size and the desired collection efficiency of particles that are to be collected.

Though three rows of micropillars 2 are demonstrated to be sufficient for collecting a majority of particles entrained in a fluid stream, a single row, two rows, or more than three rows of micropillars 2 may be provided depending on the desired result. For example, when the fluid velocity is low or the fluid stream is not advancing generally perpendicularly to the rows of micropillars 2, the particles have less inertia and, thus, more rows of micropillars may be required to collect a majority of the particles, and vice versa. A single row of micropillars 2 may be useful in collecting particles having a diameter size that is at least slightly larger than the width of passageways 12 defined between micropillars 2.

The number of pillars to be provided in each row and the height of each pillar are freely modifiable depending on the desired total throughput. For example, when 100-micron diameter micropillars are configured as described above in reference to FIG. 2 (in three rows and with the height to diameter ratio of each micropillar being 10:1), approximately 8.3 cm-wide rows of micropillars 2 will be required to process 100 liter per minute (LPM) of a particle-laden fluid stream at a flow velocity of 10 m/s.

The diameter "d" and spacing of micropillars 2 may differ from one row to another in one collection sheet 1. Further, the spacing between adjacent rows may vary on collection sheet 1. For example, it may be advantageous to vary the diameter and spacing of micropillars 2 and the spacing between adjacent rows of micropillars 2 on collection sheet 1 from relatively large to relatively small along the direction of a particle-laden fluid flow. This arrangement allows collection sheet 1 to collect particles of varying sizes, from relatively large particles to relatively small particles.

To increase collection efficiency of micropillars 2, electric charge may be embedded within micropillars 2, or applied externally on the surfaces of micropillars 2, to produce electric fields. Stored electric charge, or bound charge, will enhance the separation of aerosols/particles from a fluid stream due to electrostatic precipitation process induced by an electric field as known in the art, similarly to an Electret® filter, also known in the art. Any suitable method of embedding charge known in the art may be used, for example, stretching or extruding charged polymer material to form micropillars 2. Alternatively, n-type or p-type dopants may be added to micropillars 2 formed of semiconductor material. Electric charge may also be applied externally on the surfaces of micropillars 2 by, for example, applying a conductive coating on the surfaces and charging the coating.

Optionally, when charge is included in micropillars, whether internally or externally, a suitable packing material may be placed in the spaces between micropillars 2. Any dielectric materials having a high surface area, such as glass silica fibers or porous beads may be used. An example of a packing material is Ambersorb available from Rohm & Hass in Philadelphia, Pa. Such material serves to spread out the electric field created among micropillars 2, in a similar manner as in an Electret® filter. This serves to separate or intercept even more or smaller particles, which may then impact and become deposited on micropillars 2.

Further, the packing material having a high surface area may serve to absorb and desorb the particles entrained in a fluid stream while letting through the fluid stream itself. Thus, the packing material increases the period of time during which the particles reside among micropillars 2. When the particles to be separated are hazardous particles comprising biological contaminants or toxic chemical components, it may be preferable to deactivate or decompose these particles, instead of collecting them. For example, high voltages may be applied to micropillars 2 to initiate a plasma discharge, which serves to oxidize the particles. Because the material traps the hazardous particles within for a prolonged period time, the plasma, or ionized gas, will have sufficient time to deactivate or decompose these particles.

Alternatively, even when the micropillars are not charged, a suitable absorbent or fibrous material having a high surface area may be placed in the spaces between the micropillars or applied on the surface of the micropillars. In this case, the material provides additional surfaces onto which particles may impact and become deposited on.

The particles collected on micropillars 2 may be subsequently removed for collection or analysis. The particles may be shaken off by vibrating micropillars 2 using, for example, a sonication device. It has been found that this method typically allows for extraction of 80 to 90% of the particles deposited on micropillars 2. Alternatively, the particles may be blown off using a gaseous stream, or may be washed off using a suitable chemical, such as tetrahydrofuran, as known in the art. Further alternatively, and preferably, collection liquid, such as water, may be used to rinse off the particles from micropillars 2 to entrain the particles therein. When collection liquid is used, it is preferable to apply a coating on the surfaces of micropillars 2 to assist removal of the particles from micropillars 2 upon application of the collection liquid. In this regard, the coating preferably has such characteristics that it is adhesive to particles/aerosols when the coating is dry, but it easily releases the particles/aerosols into collection liquid when it is wet. The former characteristic allows the micropillars to retain impacting particles without bouncing or immediately releasing them back into a fluid stream. The latter characteristic allows easy extraction of the particles with a small amount of liquid for collection or analysis. One example of such a material is available from the Washington Technology Center in Seattle, Wash., under the name of TETRAGLYME™ polymeric coating. The coating material such as Tetraglyme may be applied on the surfaces of micropillars 2 by various methods, for example, by plasma deposition as known in the art. It has been observed that the extraction efficiency, defined as the number of particles captured in the collection fluid per the number of particles deposited on micropillars 2, almost doubles when the surfaces of micropillars 2 are coated with TETRAGLYME™ polymeric coating as compared to when the surfaces include no coating. Alternatively, a coating may comprise polymeric materials having "non-stick" characteristics, for example, fluoropolymers such as TEFLON® polymer, or a material available from EM Corporation in Peachtree City, Ga. under the name of PARALENE™ polymeric coating. "Non-stick" polymeric materials assist in easy extraction of the particles from the coated surfaces of micropillars 2, whether the surfaces are wet or dry. At the same time, micropillar array 10 is structured as such that particles impacting micropillars 2 remain deposited on their surfaces. Thus, polymeric material coating, such as PARALENE™ polymeric coating, is useful in facilitating particle extraction, both when collection liquid is used to collect particles therein and when a "dry" particle collection method, such as the vibration method, is used to collect particles. With any types of coating materials, satisfactory results have been achieved using a coating applied with a thickness of approximately 1 to 3 angstroms. Therefore, the coating's effect on an overall diameter size of micropillar 2 is negligible.

A micropillar array 10 structure comprising a plurality of micropillars 2 may be used independently as a particle collection apparatus. FIGS. 4A and 4B schematically illustrate an example of such apparatus. A plurality of particle collection sheets 1 are stacked together. As noted above, the number of collection sheets 1 to be stacked together and, thus, the total, or combined, height of micropillars 2 are determined based on the desired throughput level. The stacked collection sheets 1 are placed upstream of a suction fan 14. A pump 16 and a reservoir 18 are provided to subsequently rinse off particles from micropillars 2 with liquid, without having to disassemble the stacked collection sheets 1, to collect particles therefrom, as more fully described below.

When suction fan 14 causes a particle-laden fluid 20 to flow through micropillar array 10 provided on particle separation sheets 1, at least some particles impact and become deposited on micropillars 2. To collect the deposited particles, suction fan 14 is turned off, and pump 16 is turned on to spray suitable liquid, such as water droplets, to micropillars 2 to rinse off the particles. The liquid entraining the particles therein is collected in reservoir 18. The liquid may be recirculated to be sprayed to micropillars 2 for further rinsing, or may be collected for analysis.

FIG. 5 schematically illustrates another embodiment of micropillar array 10 as a particle collection apparatus. Micropillars 2 are arranged in a plurality of concentric circles to form a generally circular micropillar array 10 on a disk 22. Particle-laden air 20 may be blown radially inward as indicated by arrows, or may be blown radially outward (not shown). When air 20 is blown radially inward, a suitable exhaust means is provided to a central portion 21.

In either event, micropillar array 10 collects particles thereon. The deposited particles may then be collected by various methods. For example, a suitable collection liquid may be applied to micropillar array 10 to rinse off the particles, and disk 22 may be spun to centrifugally separate the liquid entraining the particles from micropillars 2. To continuously use micropillar array 10 on disk 22, disk 22 may be combined with a suitable divider 24 having three sections: a particle deposition section 26, particle collection section 28, and micropillar drying section 30. In operation, disk 22 is slowly rotated in the direction of an arrow relative to divider 24. Micropillars 2 on disk 22 within particle deposition section 26 receive a particle-laden fluid stream to collect particles therefrom. The micropillars are then moved into particle collection section 28, where a suitable liquid, such as water, is sprayed to rinse off the particles from the micropillars. The liquid entraining the particles may be collected or analyzed. The micropillars are then moved into micropillar drying section 30, where they are dried using any suitable means, such as a hot air blower. The micropillars are now ready to be moved back into particle deposition section 26 to again receive a particle-laden fluid stream to collect particles thereon.

Alternatively, micropillars 2 of the present invention may be combined with, or incorporated within, any other aerosol/particle collection/separation/concentration apparatus. For example, micropillars 2 may be placed to receive a preconcentrated particle-laden fluid stream, or a "minor flow" as known in the art of virtual impactors. Alternatively, micropillars 2 may be placed upstream of any other particle collector/separator as a prefilter. Examples of an apparatus that can easily incorporate micropillars 2 of the present invention can be found in copending U.S. patent application Ser. No. 09/191,977, filed Nov. 13, 1998, entitled CENTRIFUGE, PARTICLE SEPARATOR, Ser. No. 09/191,980, filed Nov. 13, 1998, entitled MICROMACHINED VIRTUAL IMPACTOR, and Ser. No. 09/191,982, filed Nov. 13, 1998, entitled MICROMACHINED VIRTUAL IMPACTOR assigned to the same assignee as this application, and each filed concurrently herewith, which are herein expressly incorporated by reference. In general, a particle-laden fluid advancing toward micropillars 2 preferably has enough velocity and inertia to be successfully separated onto micropillars 2. This may require a suitable means for accelerating a fluid stream, for example a nozzle, to be placed upstream of micropillars 2 when combining micropillars 2 with other particle separation/collection apparatus.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A plurality of micropillars for separating particles from a fluid stream, the micropillars each having a maximum cross-sectional dimension of about 4,000 microns and being arranged in a first row, in which the micropillars are spaced apart from each other to define fluid passageways therebetween.

2. The micropillars of claim 1, further comprising micropillars in a second row that is spaced apart from the first row, the micropillars in the second row being spaced apart from each other to define fluid passageways therebetween, the micropillars in the second row being offset from the micropillars in the first row.

3. The micropillars of claim 2, further comprising micropillars in a third row that is spaced apart from the second row, the micropillars in the third row being spaced apart from each other to define fluid passageways therebetween, the micropillars in the third row being offset from the micropillars in the second row and being aligned with the micropillars in the first row.

4. The micropillars of claim 1, wherein a diameter of each micropillar is between about 1 microns and about 4,000 microns.

5. The micropillars of claim 4, wherein the diameter is between about 100 microns and about 400 microns.

6. The micropillars of claim 5, further comprising a coating applied on surfaces of the micropillars, the coating comprising a material that is adhesive to particles when the coating is dry but facilitates removal of the particles therefrom when the coating is wet.

7. The micropillars of claim 1, further comprising a coating applied on surfaces of the micropillars, the coating comprising a material that is adhesive to particles when the coating is dry but facilitates removal of the particles therefrom when the coating is wet.

8. The micropillars of claim 7, wherein the coating comprises a TETRAGLYME™ polymeric coating material.

9. The micropillars of claim 1, further comprising a coating applied on surfaces of the micropillars, the coating comprising a non-stick polymeric material.

10. The micropillars of claim 9, wherein the coating comprises fluoro-polymers.

11. The micropillars of claim 1, further comprising electric charges included in, or on surfaces of, the micropillars to produce electric fields.

12. The micropillars of claim 1, further comprising an absorbent or fiber material included in the spaces between the micropillars.

13. The micropillars of claim 1, further comprising an absorbent or fiber material applied on surfaces of the micropillars.

14. A method of separating particles from a fluid stream, comprising the steps of:
  (a) providing a plurality of micropillars, each having a maximum cross-sectional dimension of about 4,000 microns, said plurality of micropillars being arranged in at least a first row and a second row that are spaced apart from each other, the micropillars in each row being spaced apart from each other to define fluid passageways therebetween, the micropillars in the first row being offset from the micropillars in the second row;
  (b) causing a particle-laden fluid stream to flow through the micropillars in a direction generally perpendicular to the first and second row; and
  (c) depositing at least a portion of the particles on the surfaces of the micropillars.

15. The method of claim 14, further comprising collecting the particles from the micropillars.

16. The method of claim 15, wherein the collection comprises applying fluid to the micropillars to entrain the particles therein.

17. The method of claim 16, wherein the fluid is liquid.

18. The method of claim 17, wherein the fluid is water.

19. The method of claim 17, wherein the micropillars are coated with a material that is adhesive to particles when the coating is dry but facilitates removal of the particles therefrom when the coating is wet.

20. The method of claim 19, wherein the coating comprises a TETRAGLYME™ polymeric coating material.

21. The method of claim 14, wherein the micropillars are coated with a non-stick polymeric material.

22. The method of claim 21, wherein the coating material comprises fluoro-polymers.

23. The method of claim 14, wherein a diameter of each micropillar is between about 1 microns and about 4,000 microns.

24. The method of claim 23, wherein the diameter is between about 100 microns and about 400 microns.

25. The method of claim 14, wherein the micropillars include electric charges included in, or on surfaces of, the micropillars to produce electric fields.

26. The method of claim 14, further comprising an absorbent or fiber material included in the spaces between the micropillars.

27. The method of claim 14, further comprising an absorbent or fiber material applied on the surfaces of the micropillars.

* * * * *